United States Patent [19]

Sato

[11] Patent Number: 4,922,671
[45] Date of Patent: May 8, 1990

[54] METHOD FOR EFFECTIVELY RESTRAINING RESPONSE OF A STRUCTURE TO OUTSIDE DISTURBANCES AND APPARATUS THEREFOR

[75] Inventor: Takanori Sato, Tokyo, Japan

[73] Assignee: Shimizu Construction Co., Ltd., Tokyo, Japan

[21] Appl. No.: 191,278

[22] Filed: May 6, 1988

[30] Foreign Application Priority Data

| Nov. 17, 1987 | [JP] | Japan | 62-290233 |
| Nov. 17, 1987 | [JP] | Japan | 62-290235 |
| Nov. 17, 1987 | [JP] | Japan | 62-290237 |
| Nov. 17, 1987 | [JP] | Japan | 62-290238 |

[51] Int. Cl.$^5$ .............................................. E02D 27/34
[52] U.S. Cl. ..................................... 52/167 DF; 52/1; 52/741
[58] Field of Search ................... 52/167 DF, 1, 741

[56] References Cited

U.S. PATENT DOCUMENTS

| 4,226,554 | 10/1980 | Vandiver | 405/195 |
| 4,264,233 | 4/1981 | McCambridge | 405/28 |
| 4,712,944 | 12/1987 | Rose | 405/28 |
| 4,783,937 | 11/1988 | Sato | 52/168 |

FOREIGN PATENT DOCUMENTS

| 999421 | 7/1965 | United Kingdom . |
| 1322807 | 7/1973 | United Kingdom | 52/167 |

Primary Examiner—Henry E. Raduazo
Attorney, Agent, or Firm—Hoffmann & Baron

[57] ABSTRACT

The present invention is related to a method for restraining response of a structure to outside disturbances such as winds and earthquakes etc. and an apparatus therefor.

According to the invention there is provided an apparatus which comprises (a) an enclosure defining an inner space thereby, (b) a liquid retained in the enclosure and having a free surface, and (c) an obstacle means disposed in the enclosure for disturbing a flow of the liquid, whereby the liquid has at least one sloshing natural frequency and the obstacle means increases damping coefficient of the sloshing.

According to the invention, there is also provided a method which comprises the steps of (a) attaching at least one enclosure to the structure, the enclosure defining an inner space, (b) attaching at least one obstacle means to the enclosure so that the obstacle is retained inside the enclosure, and (c) providing the enclosure with liquid so that a prescribed portion of the inner space filled with the liquid and the liquid has a free surface, wherein dimensions of the enclosure and the amount of the liquid is so determined that a sloshing natural frequency of the liquid generally coincides with the natural frequency of the structure.

18 Claims, 6 Drawing Sheets

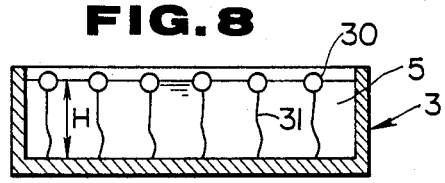
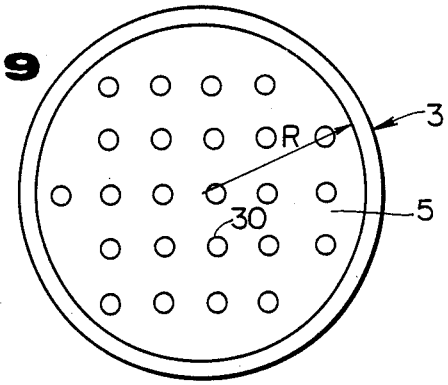
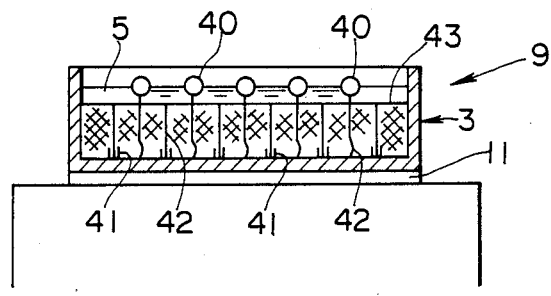
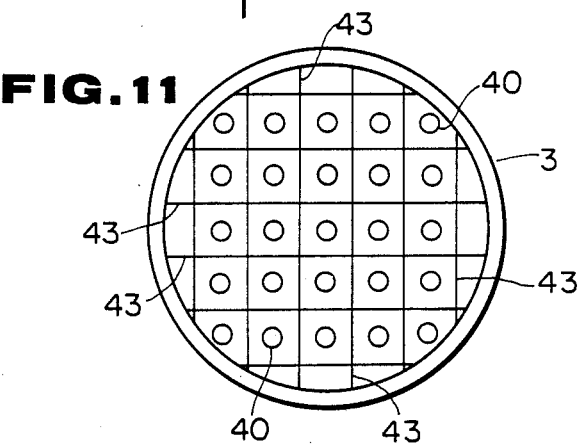

METHOD FOR EFFECTIVELY RESTRAINING RESPONSE OF A STRUCTURE TO OUTSIDE DISTURBANCES AND APPARATUS THEREFOR

BACKGROUND OF THE INVENTION

The present invention relates to an apparatus and a method for restraining response of a structure to outside disturbances such as winds, earthquakes etc.

One conventional method for making structures resistant against such vibrational loads as earthquakes, winds and traffics is to construct the structure enough strong to withstand the external loads. But recently, a notion so called a seismic isolation has been developed and brought into practical use for protecting the structure from seismic loads. The seismic isolation is to support the structure by a soft and flexible support and absorb the seismic load by a large deformability of the support. A problem as to the seismic isolation is, though the isolation is effective for cutting off vibrational loads which is to be induced through the support, that it sometimes makes the situation worse when a vibrational load is induced directly to the building without passing through the supports. Such situations occur when the structure vibrates because of winds or, for example, when a bridge vibrates because of the traffic passing thereon. In such cases, vibration is apt to become larger if a conventional seismic isolation technique is applied.

In order to resolve these inconveniences, present inventors have already proposed a vibration restraining apparatus for buildings as described in Japanese patent application 62-241045. Japanese Patent Application, discloses a vibration restraining apparatus comprising a tank and a liquid retained in the tank to be installed on the roof of a building so as to restrain vibration of the building. As the building vibrates, vibrational energy of the building excites the liquid, having a sloshing natural frequency identical to a natural frequency of the building, to slosh in resonance with the building. Consequently, vibration of the building is restrained as the vibrational energy of the building is transmitted to the liquid. It was stated in the specification that the weight of the liquid retained in the tank had better be larger than 1% of the building so as to assure an effectiveness.

A problem as to the above-mentioned apparatus and methods for restraining vibration of a building is that the apparatus has a very narrow band of resonance. Therefore, the apparatus acts only when it is excited at its natural frequency exactly. However, it is very difficult to determine the dimensions of the tank and the amount of the liquid so that the natural frequency of sloshing exactly resonate with the vibration of the building. Further, if the natural frequency of the structure shifts by deterioration of the material for example, the apparatus becomes "detuned" and thus rendered ineffective for its intended purpose.

Another problem is that sloshing of the liquid continues long because the damping coefficient in sloshing is normally far less than that of ordinary structures. Therefore, after external excitation such as winds and earthquakes is terminated, the liquid continues to slosh and the liquid becomes a source of vibration to exite the structure.

(2.) SUMMARY OF THE INVENTION

In order to solve such insufficiencies residing in prior methods and apparatus, the present invention is directed to provide a method for restraining response of a structure to outside disturbances and an apparatus therefor which has a relatively wide frequency band.

Another object of the invention is to provide an apparatus for restraining response of a structure of which the free oscillation stabilizes speedily.

Another object of the invention is to provide an apparatus which is effective to reduce swirling motion of a structure.

In one aspect of the present invention, the apparatus according to the present invention comprises (a) an enclosure defining an inner space thereby, (b) a liquid retained in the enclosure and having a free surface, and (c) an obstacle means disposed in the enclosure for disturbing a flow of the liquid, whereby the liquid has at least one sloshing natural frequency and the obstacle means increases damping coefficient of the sloshing.

In another aspect of the present invention, there is provided a method for restraining vibration of a structure, the structure having a natural frequency, the method comprising the steps of (a) attaching at least one enclosure to the structure, the enclosure defining an inner space, (b) attaching at least one obstacle means to the enclosure so that the obstacle is retained inside the enclosure, and (c) providing the enclosure with liquid so that a prescribed portion of the inner space is filled with the liquid, the obstacle is submerged in the liquid, and the liquid has a free surface, wherein dimensions of the enclosure and the amount of the liquid is so determined that a sloshing natural frequency of the liquid generally coincides with the natural frequency of the structure and water flow while sloshing is disturbed by the obstacle.

(3.) BRIEF DESCRIPTION OF THE DRAWINGS

FIG. 8 is a vertical cross-sectional view of a second embodiment of the present invention.

FIG. 9 is a plan view of a second embodiment of the present invention.

FIG. 10 is a vertical cross-sectional view of a third embodiment of the present invention.

FIG. 11 is a plan view of a third embodiment of the present invention.

(4.) PREFERRED EMBODIMENTS OF THE INVENTION

Preferred embodiments of the present invention will be described in detail hereinafter.

(1) First preferred embodiment

Figure 3:
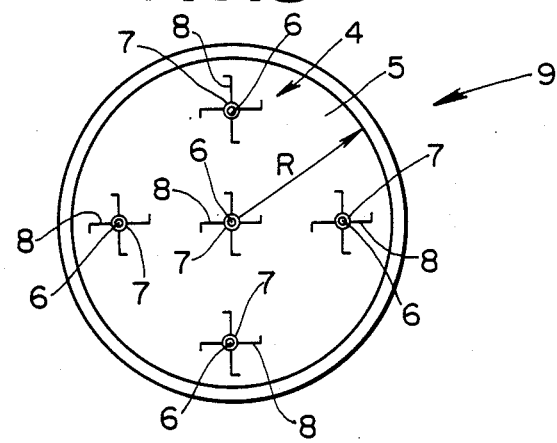
FIG. 3 is a plan view of a first embodiment of the apparatus according to the present invention.
Figure 4:
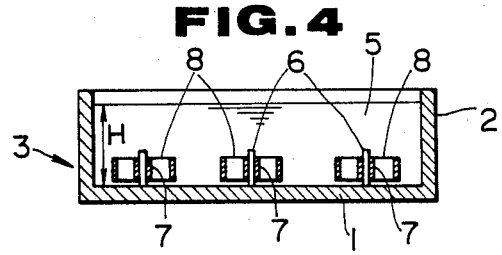
FIG. 4 is a vertical cross-sectional view of a first embodiment of the present invention.

First preferred embodiment shown in FIGS. 3 and 4 comprises an enclosure 3 having a circular bottom plate 1 and a cylindrical side wall 2, water 5 retained in the enclosure 3, and five watermill means 4 disposed in the enclosure 3 and submerged in the water 5. As shown in the figures, the watermill means 4 comprises a rod 6 attached to the bottom plate 1 at its lower end and standing vertically therefrom, a bearing means 7 attached to the rod 6 for a rotational movement thereabout, and four blades 8 attached to the bearing means 7 at their proximal edges. A distal edge of each blade 8 is bent generally perpendicular to other parts so that four blades 8 form a counterclockwise swastika in a plan view.

Figure 1:
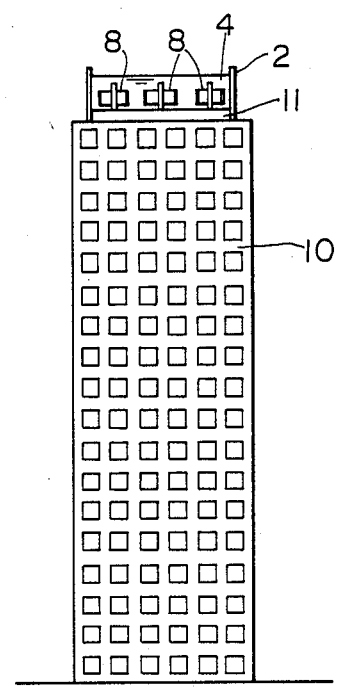
FIG. 1 shows a building and an apparatus for restraining response of outside disturbances according to the present invention installed at a top of the building.

The above-mentioned apparatus 9 is located on top of a building 10 by sandwiching a support means 11 between the bottom plate 1 and the top of the building, as illustrated in FIG. 1. The support means 12 comprises a plurality of steel plates and sheets of elastic material, such as rubber, laminated alternately horizontally. By virtue of the construction, support means 12 has a relatively low rigidity in horizontal directions and relatively high rigidity in vertical directions.

When the building responds to wind loads or earthquake motions induced to the building, the water 5 retained in the enclosure 3 sloshes. Water flow accompanying the sloshing makes the watermills 4 turn and the blades 8 disturb the water 5 therearound. By causing irregular water flows and eddy currents therearound, the watermill 4 consumes kinetic energy of water which is in a form of sloshing. Thus, sloshing of the water is damped away gradually. Natural frequency of sloshing is tuned by properly adjusting dimensions of the enclosure and the amount of water retained in the enclosure to coincide with the natural frequency of the building. Therefore, when the building vibrates, sloshing occurs in the water restraining the vibration of the building, and the vibrational energy is damped away by virtue of the obstruction means which is watermills in this embodiment. As a result, vibration, in other words response of the building to outside disturbances, is restrained effectively by virtue of the apparatus.

The apparatus is effective not only for restraining reciprocal movement of the building but also for swirling motions of the building. When the building swirls, a swirling motion occurs in the water and the vibrational energy of the building is consumed as was explained formerly.

Because the watermills 4 are disposed so as to increase damping of sloshing by disturbing regular water flow, the watermills 4 may be replaced by other obstacle means for disturbing regular water flow. For example, the bearing may be secured to the rod for eliminating rotational movement of the watermill 4.

Figure 5:
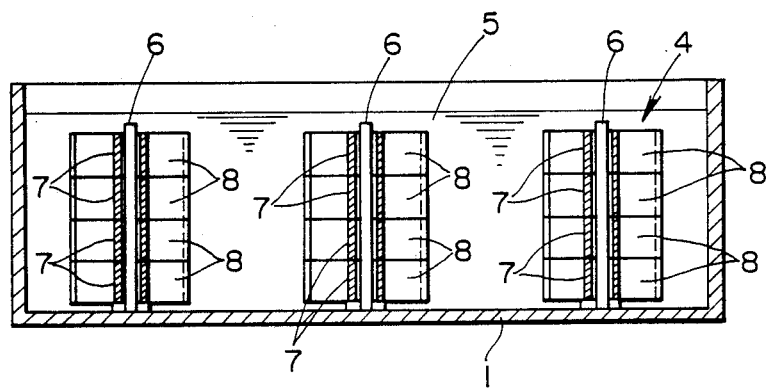
FIG. 5 is a vertical cross-sectional view of a first embodiment according to the present invention.

FIG. 5 shows an embodiment wherein a plurality of watermills 4 are attached to a rod 6. By changing the number of watermills 4 disposed in the water 5, the damping factor can be adjusted.

Effects of the vibration restraining apparatus is explained from a mathematical point of view as follows.

According to Housner's equations, effective mass M1 and natural frequency of sloshing are expressed as follows.

$$M1 = (1/4)(5/6)^2(27/8)R \cdot \tanh(\sqrt{27/8})/(\sqrt{27/8}\, H) \cdot M$$

wherein
M1 effective mass of water in sloshing
H: depth of water
R: radius of the tank
M: total mass of water retained in the tank $$4\,pi^2 f^2 = (H/R)\sqrt{27/8}\,\tanh(\sqrt{27/8}\cdot(H/R))$$

pi: ratio of a circumference to its diameter

According to the above equations, for a case wherein H=2m and R=15m, effective mass M1=812 ton and natural period (inverse number of natural frequency) is 11.7 sec.

Once an effective mass and natural frequency of sloshing is known, effects of the apparatus from a point of view of vibration is modeled by an ordinary oscillator composed of a mass M, a spring supporting the mass and having a rigidity K, and a damper connected to the mass parallel to the spring and having a damping coefficient C. The model is called a Voigt Model. Natural frequency Fn of such a Voigt Model is approximately given by the following equation.

$$Fn = \sqrt{K/M}\,/2\,pi$$

pi: the ratio of the circumference of a circle to its diameter

Therefore, by using the above equation, effective rigidity K of the spring is obtained.

Figure 2:
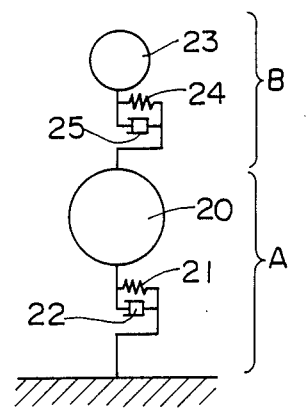
FIG. 2 shows a two-degree-of-freedom oscillator representing vibrational characteristics of the building and the apparatus.

The building also is modeled by a Voigt Model, properties of which being different from those of the apparatus 9, naturally. So, a building equipped with a vibration restraining apparatus is modeled by a couple of Voigt Models, one mounted on top of the other as shown in FIG. 2.

Operation of the embodiment will now be explained referring to FIG. 2 which is a so called two-degree-of-freedom oscillating system. A mass-spring-dashpot system A represents schematically vibrational characteristics of the building. A mass 20, a spring 21 and a dashpot 22 represent effective mass, effective stiffness and effective damping of the mode, respectively, which are determined by the structural property of the building. A mass-spring-dashpot system B represent the present apparatus. A mass 23, a spring 24, and a dashpot 25 represent the effective mass, the effective rigidity of the spring and the damping coefficient respectively of sloshing. Property of dashpot 25 is determined mainly by viscosity of the liquid and geometry of the watermill.

As far as the effective mass of sloshing is lower than a few percent of the effective mass of the building, coupling effect in the natural frequency of the building and sloshing is negligible. Therefore, when the natural frequency of the building coincides with that of the apparatus, so does the natural frequency of the coupled two-degree-of-freedom system.

Natural frequency of the building Fb is determined as follows.

$$Fbn = \sqrt{Kn/Mn} \,/2\,pi$$

wherein
Kn : modal stiffness of the building
Mn : modal mass of the building

Then, it becomes possible to set a natural frequency of the apparatus equal to the natural frequency of the building by virtue of the above-mentioned equations.

Because the vibration of the weight resonates with the vibration of the building when the building vibrates due to earthquakes etc., the vibrational amplitude of the building is reduced by virtue of the vibration restraining apparatus. The apparatus acts as a so called dynamic damper. In other words, vibrational energy of the building is transmitted to the apparatus and generates sloshing in the water. The vibrational energy once transmitted to the apparatus is gradually dissipated by means of the watermill. Proportionally to the amount of vibrational energy transmitted to the apparatus and consumed therein, vibrational amplitude of the building is reduced. Thus, vibration or response of the building is restrained by virtue of the present apparatus.

In the above explanation, vibrational characteristics of the building was represented by the first mode and the effects of the vibration restraining apparatus were explained on that basis, for a simplicity of explanation. But application of the vibration restraining apparatus is not restricted to restrain the first mode of a building but it is also applicable to restrain any other modes of the building. In such cases, the vibration restraining structure had better be installed where the building displaces largely in the target mode. Consequently, the restraining apparatus may be installed on or at a plurality of intermediate floors.

(2) Second Embodiment of the Invention

FIGS. 8 and 9 show a modified embodiment of the present apparatus for restraining response of a structure. Instead of watermills submerged in the water in the first embodiment, there is provided a float means 30 and tying means 31 for tying the floating means to the enclosure. In the present embodiment, 24 float means 30 are floating at a surface of the water 5 and as many strings 31, connected to the floating means 30 at one end and connected to the enclosure 3 at the other end, restrict a dislocation of the floating means within a prescribed extent.

By virtue of the above-mentioned construction, when the sloshing occurs in the water, both the floats 30 and the tying means 31 disturb a regular water flow accompanying the sloshing. Therefore, kinetic energy of sloshing is consumed by irregular and local water flow caused by the floats 30 and the tying means 31. So, also by the present embodiment, damping coefficient is increased.

(3) Third Preferred Embodiment of the Invention

In a third preferred embodiment of the invention, there is provided an apparatus for restraining response of a structure which comprises floating means 40 floating at a surface of the water 5, tieing means 42 tieing the floating means 40 to the enclosure 3, mesh means 43 having apertures therethrough and separating the water region into segments, and retainers 41 for positioning the mesh means 43 at prescribed positions. The mesh means 43 are shorter than the depth H of the water 5 and submerged under water.

By virtue of the third preferred embodiment, water flow accompanying the sloshing is disturbed more largely than in the former case due to the floats 40, the tieing means 42 and the mesh means 43. Therefore, damping coefficient increases more largely.

In the drawing, the mesh means 43 are so disposed as to form a lattice in a plan view. But arrangement of the mesh means 43 is not restricted to a lattice form but it may be in any other forms as far as the mesh means disturb the water flow. Further, the mesh means 43 may be disposed horizontally, because the sloshing is accompanied by a vertical movement of water.

(4) Fourth preferred embodiment of the invention

Figure 12:
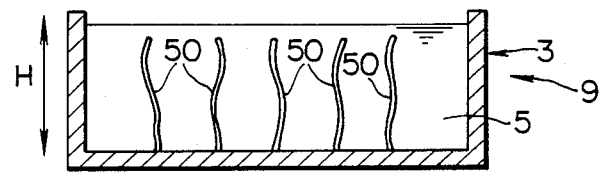
FIG. 12 is a vertical cross-sectional view of a fourth embodiment of the present invention.
Figure 13:
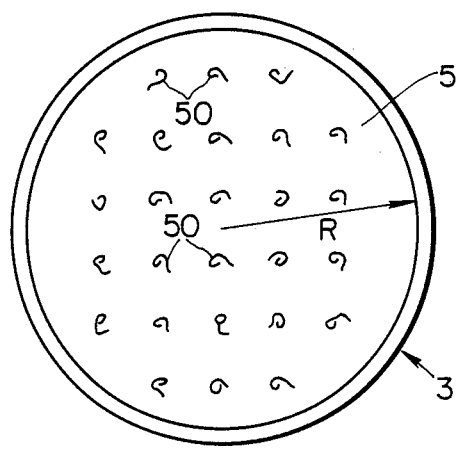
FIG. 13 is a plan view of a fourth embodiment of the present invention.

FIGS. 12 and 13 represent a fourth modified embodiment of the present invention. According to the embodiment, elongated resilient members 50 are disposed in the water 5, one end of which being attached to the bottom of the enclosure 3, the other end of which being free. Because the density of the members 50 is smaller than that of water, the members 50 stand half floating by virtue of its buoyancy. The members are generally straight but they are not necessarily straight. Further irregularities in the form may increase the damping.

When the water 5 in the enclosure 3 sloshes, the resilient members 50 sway according to the water flow. Mainly by virtue of the friction between the members 50 and the water and disturbances in water caused by the members 50, sloshing is damped.

(5) Fifth preferred embodiment of the invention

Figure 14:
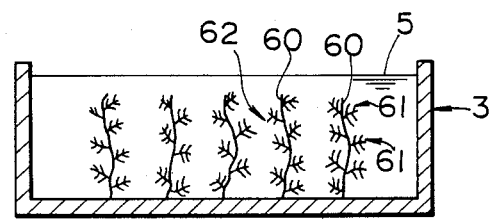
FIG. 14 is a vertical cross-sectional view of a fifth embodiment of the present invention.

FIG. 14 shows a fifth preferred embodiment wherein an obstacle means 62 submerged in the water 5 is made of a resilient material and comprises a trunk 60, and branches 61 attached to the trunk 60. A lower end of the trunk 60 is attached to the bottom of the enclosure 3 and the obstacle means stands thereon.

By virtue of a more complex geometrie compared to the former embodiment, the obstacle means 62 is more effective than the elongated member 50 in increasing the damping.

(6) Sixth preferred embodiment of the invention

Figure 15:
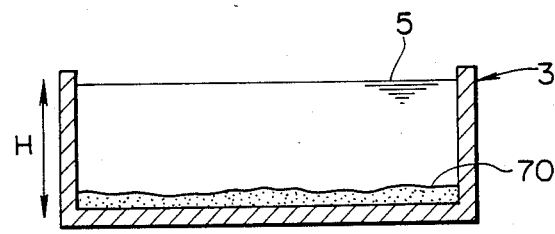
FIG. 15 is a cross-sectional view of a sixth embodiment of the present invention.
Figure 16:
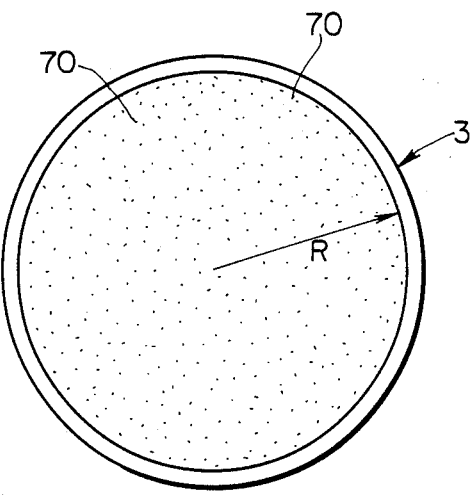
FIG. 16 is a plan view of a sixth embodiment of the present invention.

FIGS. 15 and 16 show a sixth preferred embodiment wherein sands 70 are retained in the enclosure 3 together with the water 5. When the water 5 sloshes, the sand 70 flows together with the water 5 and dissipates the kinetic energy by friction between sand particles and between sand 70 and the water 5.

As is made clear by the above explanation, the invention is not restricted to the above-mentioned embodiments but any apparatus comprising (a) an enclosure defining an inner space thereby, (b) a liquid retained in the enclosure and having a free surface, and (c) an obstacle means disposed in the enclosure for disturbing a flow of the liquid may be effective in restraining effectively response of a structure to outside disturbances.

Further, geometry of the enclosure is not restricted to a cylindrical form and any form may be employed as far as the liquid retained therein has a sloshing natural frequency.

By virtue of the present invention there is provided a method for restraining response of a structure to outside disturbances and an apparatus therefor which has a relatively wide frequency band.

Further, the present invention provides apparatus for restraining response of a structure of which the free oscillation stabilizes speedily.

Another characteristics of the present invention is that an apparatus which is effective to reduce swirling motion of a structure is provided.

5. Example

Figure 6:
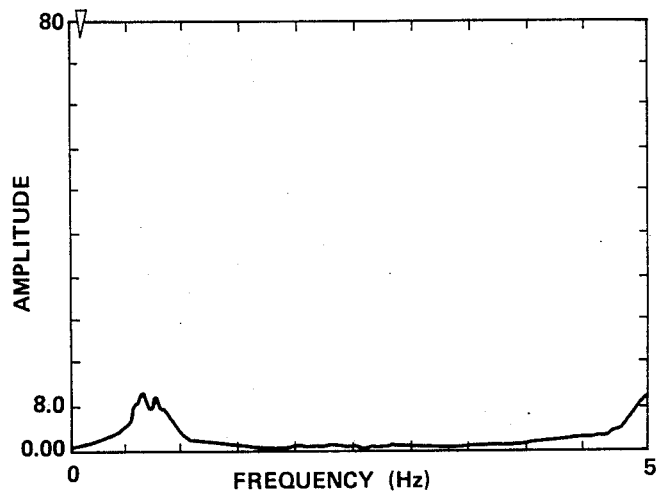
FIG. 6 shows a spectrum of a response of the building when the building is equipped with an apparatus according to the present invention.
Figure 7:
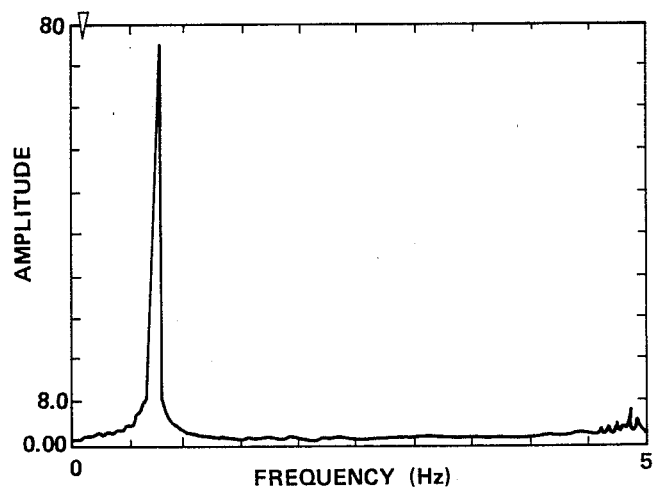
FIG. 7 shows a spectrum of a response of the building when the building is not equipped with the apparatus.

FIGS. 6 and 7 represent experimental results derived from experiments performed on a structure model with and without an apparatus for restraining response of the structure according to the present invention. FIG. 6 is a spectrum of a response time history of a structure model equipped with the apparatus comprising water and obstacle means. FIG. 7 is a spectrum of a response of a structure model wherein water is not retained in the apparatus. The peak around 0.7 Hz is a natural frequency of the structure and that of sloshing. In case where the apparatus retains water, the peak appearing at around 0.7 Hz is much smaller than in the other case. Total area of the spectrum in FIG. 6 is lower than in FIG. 7 which implying that the total power of response is smaller when the structure is equipped with the restraining apparatus. On the contrary, response of the structure is quasi sinusoidal because of a concentration of vibration energy to a narrow band around 0.7 Hz.

Therefore, from experiments also, the effectiveness of the present invention is verified.

What is claimed is:

1. An apparatus for effectively restraining response of a structure to outside disturbances over an extended frequency band, the structure having a natural frequency, the apparatus comprising:
   (a) an enclosure defining an inner space thereby and being secured to the structure;
   (b) a liquid retained in the enclosure and having a free surface, said liquid retained in said enclosure forming a vibration damping system characterized by at least one sloshing natural frequency of said liquid and a damping coefficient, said sloshing natural frequency of said liquid generally coinciding with said natural frequency of said structure; and
   (c) a dynamic obstacle means disposed in said enclosure and submerged in said liquid for disturbing a flow of the liquid sloshing in said enclosure in response to outside disturbances, whereby said dynamic obstacle means increases said damping coefficient of said vibration damping system so as to extend the frequency response of said vibration damping system over an extended frequency band.

2. The apparatus for effectively restraining response of a structure to outside disturbances according to claim 1, wherein said dynamic obstacle means comprises at least one watermill provided in the inner space and submerged in the liquid for disturbing liquid flow when the liquid sloshes in response to outside disturbances.

3. The apparatus for effectively restraining response of a structure to outside disturbances according to claim 2, wherein the watermill is supported from the enclosure and rotatable in response to the flow of said liquid.

4. The apparatus for effectively restraining response of a structure to outside disturbances according to claim 3, wherein the number of watermills is changeable.

5. An apparatus for effective restraining response of a structure to outside disturbances according to claim 1, wherein the obstacle means comprises at least one float means floating on the surface of the liquid and at least one tieing means to restrict a movement of the float against the enclosure.

6. An apparatus for effectively restraining response of a structure to outside disturbances according to claim 5, wherein the tieing means comprises a string made of a resilient material.

7. An apparatus for effectively restraining response of a structure to outside disturbances according to claim 1, wherein the obstacle means comprises at least one barrier means submerged in the fluid, the barrier means having a plurality of apertures therethrough for restricting and permitting the liquid flow therethrough.

8. An apparatus for effectively restraining response of a structure to outside disturbances according to claim 7, wherein the barrier means is a metal mesh.

9. An apparatus for effectively restraining response of a structure to outside disturbances according to claim 1, wherein the obstacle means comprises at least one float means floating on the surface of the liquid, at least one tieing means to restrict a movement of the float against the enclosure, and at least one barrier means submerged in the fluid, the barrier means having a plurality of apertures therethrough for restricting and permitting the liquid flow therethrough.

10. An apparatus for effectively restraining response of a structure to outside disturbances according to claim 1, wherein the obstacle means comprises a least one elongated element submerged in the liquid and fixed to the enclosure at least an end thereof.

11. An apparatus for effectively restraining response of a structure to outside disturbances according to claim 10, the elongated element has at least one branch extending from the element.

12. An apparatus for effectively restraining response of a structure to outside disturbances according to claim 1, wherein the obstacle means comprises particles mixed in the liquid.

13. An apparatus for effectively restraining response of a structure to outside disturbances according to claim 12, wherein the particles are sands.

14. An apparatus for effectively restraining response of a structure to outside disturbances according to claim 1, wherein the enclosure has a circular horizontal cross-section, and the liquid further has a swirling natural frequency.

15. For effectively restraining response of a structure to outside disturbances over an extended frequency band, said structure having a natural frequency, said apparatus comprising
   (a) an enclosure defining an inner space thereby and being secured to the structure;
   (b) a liquid retaining in the enclosure and having a free surface, said liquid retained in said enclosure forming a vibration damping system characterized by at least one sloshing natural frequency of said liquid and a damping coefficient, said sloshing natural frequency of said liquid generally coinciding with said natural frequency of said structure; and
   (c) an obstacle means disposed in said enclosure for disturbing a flow of the liquid sloshing in said enclosure, said obstacle means including at least one watermill provided in the inner space and submerged in the liquid for disturbing liquid flow when the liquid sloshes, said watermill being supported from the enclosure and rotatable in response to the flow of the liquid, wherein at least one rod is attached to the enclosure to stand vertically therefrom and at least one said watermill is rotatably attached to each said rod, whereby said obstacle means increases said damping coefficient of said vibration system so as to extend the frequency response of said vibration damping system over an extended frequency band.

16. A method for restraining effectively response of a structure to outside disturbances over an extended frequency band, said structure having a natural frequency and a natural mode corresponding thereto, the method comprising the steps of:
  (a) attaching at least one enclosure to said structure, said enclosure defining an inner space;
  (b) attaching at least one dynamic obstacle means to said enclosure so that said dynamic obstacle means is retained inside said enclosure; and
  (c) providing said enclosure with liquid so that a prescribed portion of said inner space is filled with said liquid and said liquid has a free surface, said liquid retained in said enclosure forming a vibration damping system characterized by at least one sloshing natural frequency of said liquid and a damping coefficient, wherein dimensions of said enclosure and the amount of said liquid retained therein such that at least one sloshing natural frequency of said liquid generally coincides with the natural frequency of said structure, and wherein said dynamic obstacle means is submerged in said liquid for disturbing a flow of said liquid sloshing in said enclosure in response to outside disturbances, whereby said dynamic obstacle means increases said damping coefficient of said vibration damping system so as to extend the frequency response of said vibration damping system over an extended frequency band.

17. The method according to claim 16, wherein step (a) comprises attaching said enclosure at a location on said structure where the natural mode thereof has a significant displacement and said sloshing natural frequency of said liquid coincides with said natural frequency of said structure.

18. A method for restraining effectively response of a structure to outside disturbances according to claim 16, wherein the liquid further has a whirling natural frequency generally coinciding with a natural frequency of a swirling motion of the structure.

* * * * *